(12) United States Patent
Ruste

(10) Patent No.: US 7,562,905 B2
(45) Date of Patent: Jul. 21, 2009

(54) SUBFRAME FOR A VEHICLE AND A METHOD FOR ITS MANUFACTURE

(75) Inventor: Trygve Ruste, Raufoss (NO)

(73) Assignee: Raufoss Technology AS, Raufoss (NO)

( * ) Notice: Subject to any disclaimer, the term of this patent is extended or adjusted under 35 U.S.C. 154(b) by 312 days.

(21) Appl. No.: 10/580,347

(22) PCT Filed: Nov. 21, 2003

(86) PCT No.: PCT/NO03/00391

§ 371 (c)(1),
(2), (4) Date: May 19, 2006

(87) PCT Pub. No.: WO2005/049409

PCT Pub. Date: Jun. 2, 2005

(65) Prior Publication Data

US 2007/0187938 A1    Aug. 16, 2007

(51) Int. Cl.
*B62D 21/02* (2006.01)
*B62D 21/09* (2006.01)

(52) U.S. Cl. .................. 280/796; 280/797; 280/798; 29/897.2; 296/205

(58) Field of Classification Search ............. 280/781, 280/785, 796, 797, 798, 800; 29/897.2, 525.14; 228/170, 173.4; 72/324, 331, 338; 296/203.02, 296/204
See application file for complete search history.

(56) References Cited

U.S. PATENT DOCUMENTS

| | | | | |
|---|---|---|---|---|
| 2,157,713 A | * | 5/1939 | Leibensperger et al. | 403/302 |
| 3,034,197 A | * | 5/1962 | Watanabe | 29/6.1 |
| 3,129,954 A | * | 4/1964 | Duero et al. | 280/792 |
| 4,406,343 A | * | 9/1983 | Harasaki | 180/297 |
| 4,899,843 A | * | 2/1990 | Takano et al. | 180/312 |
| 4,986,597 A | | 1/1991 | Clausen | |
| 5,058,266 A | * | 10/1991 | Knoll | 29/890.049 |
| 5,397,115 A | * | 3/1995 | Vlahovic | 296/29 |
| 5,839,776 A | * | 11/1998 | Clausen et al. | 296/187.03 |
| 6,029,353 A | * | 2/2000 | Cowan | 29/897.312 |
| 6,061,989 A | * | 5/2000 | Trivedi et al. | 52/633 |

(Continued)

FOREIGN PATENT DOCUMENTS

WO      WO 9304897      3/1993

(Continued)

OTHER PUBLICATIONS

International Search Report for International Application No. PCT/NO2003/000391.

*Primary Examiner*—Paul N Dickson
*Assistant Examiner*—Karen Jane Amores
(74) *Attorney, Agent, or Firm*—Myers Bigel Sibley & Sajovec

(57) ABSTRACT

A square shaped sub-frame for a vehicle manufactured from an especially designed aluminium profile (1). The profile comprises a first and a second channel (11, 13) separated by an intervening channel (12). Said first and second channels (11, 13) are separated in localized areas by removing wall material from the intervening channel (12). Then, the profile (1) is bent into a U-shaped or square, closed frame, said second channel (13) defining a load carrying frame. The first channel (11) is machined into mounting brackets for control arms etc.

10 Claims, 3 Drawing Sheets

U.S. PATENT DOCUMENTS

| | | | | |
|---|---|---|---|---|
| 6,099,084 | A * | 8/2000 | Bungarten et al. | 301/127 |
| 6,199,894 | B1 * | 3/2001 | Anderson | 280/638 |
| 6,343,820 | B1 | 2/2002 | Pedersen | |
| 6,672,654 | B2 * | 1/2004 | Yamada et al. | 296/205 |
| 6,877,349 | B2 * | 4/2005 | Durney et al. | 72/324 |
| 7,273,247 | B2 * | 9/2007 | Grueneklee et al. | 296/205 |
| 2005/0151394 | A1 * | 7/2005 | Grueneklee et al. | 296/204 |

FOREIGN PATENT DOCUMENTS

| | | |
|---|---|---|
| WO | WO 0046074 | 8/2000 |
| WO | WO 03/072421 A1 * | 9/2003 |

* cited by examiner

SUBFRAME FOR A VEHICLE AND A METHOD FOR ITS MANUFACTURE

RELATED APPLICATION

This application claims the benefit of priority as a national phase of International Patent Application No. PCT/NO2003/000391, filed on Nov. 21, 2003, the disclosure of which is hereby incorporated herein by reference in its entirety.

FIELD OF THE INVENTION

The present invention relates to a sub-frame for a car and in particular a lightweight sub-frame made from high-strength aluminium.

TECHNICAL BACKGROUND

Sub-frames are used in modern cars as anchoring points for suspension elements and heavy transmission elements. In particular, sub-frames are used in the front of the car for carrying the engine and the front suspension elements. The sub-frame is normally a U-formed or a rectangular closed frame made from steel or aluminium. Normally, the frame is made from a number of structural members that are welded together. In addition, a number of brackets are welded to the frame, in order to provide fastening points for the engine, control arms or steering components. In case of an aluminium construction, the number of components that have to be welded poses a challenge, as the individual components must be produced with very tight tolerances in order to use automatic welding robots. At the welding joints, gaps of maximum 0.2 mm are allowed. These high-precision production methods are of limited value in the finished product, i.e. the sub-frame is produced with tight tolerances even in places where this is unnecessary for the function of the frame, but contributes to a high production cost.

A possible production method according to prior art would be to use a square section profile and produce four different components, and weld these components together into the finished frame. Subsequently, a number of mounting details, like the engine mounting brackets, must be welded to the frame. The machining of the individual components of the frame means that a lot of material is wasted, in a typical example a frame of about 8-8.5 kg finished weight will need about 20 kg raw aluminium material. This means that about 11.5-12 kg is wasted. In addition, the welding seams are potentially weak points as the welding process impairs the structure of the aluminium.

Japanese patent application 58041737 describes a frame for a motor cycle that is manufactured from a multi chamber profile, probably in aluminium. The profile is split at the ends, between the chambers, and bent into a frame. However, this part is supplemented with cast members that are welded to it, as well as a multitude of mounting brackets that are welded or riveted to the frame. Secondary channels are used as reinforcing elements/load carrying elements in the overall frame construction.

BRIEF DESCRIPTION OF THE INVENTION

It is an object of the present invention to provide a method for producing a sub-frame for a vehicle with lower production costs than prior art methods.

Another object is to provide a method for providing a sub-frame involving fewer welding operations compared to prior art methods, and preferably involving no welding at all.

Still another object of the invention is to provide a manufacturing method that gives better yield of the raw materials involved. Typically, about 85-90% of the raw materials, in this case an aluminium profile, will end up in the finished product.

Embodiments according to the invention also include an aluminium profile especially designed for the manufacture of said sub-frame. Other embodiments of the invention will appear from the following dependent claims.

BRIEF DESCRIPTION OF THE DRAWINGS

The invention will now be described in reference to the appended drawings, in which.

DETAILED DESCRIPTION OF THE INVENTION

Figure 1:
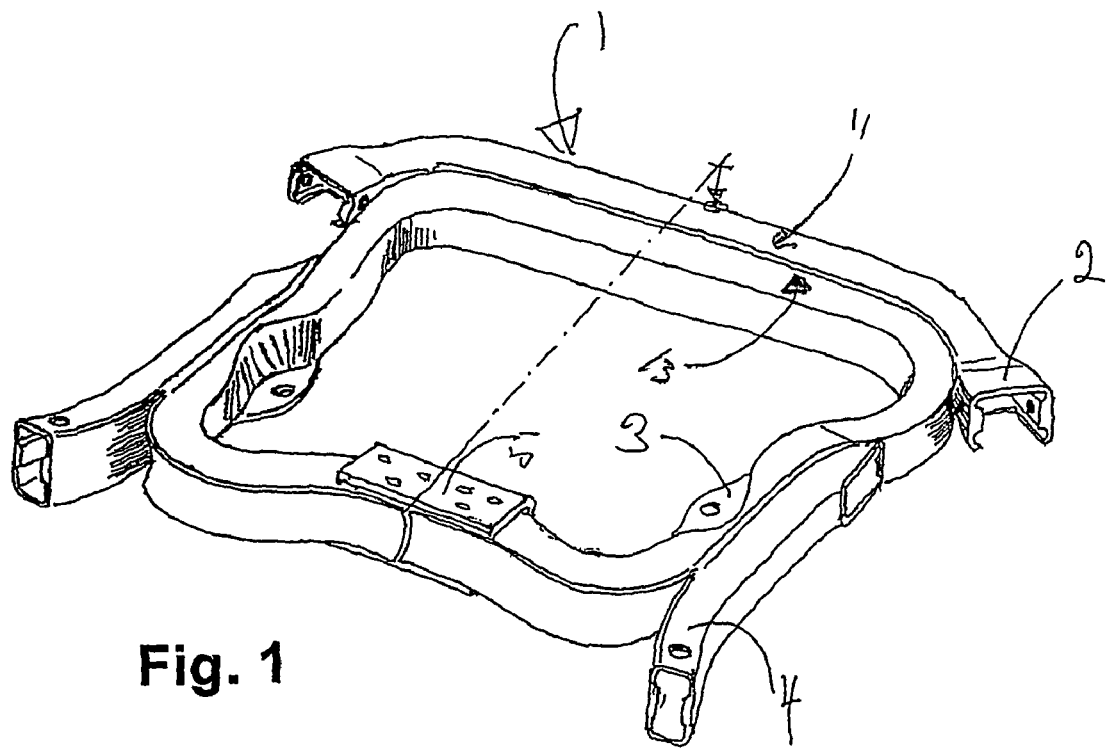
FIG. 1 is a view in perspective of a sub-frame according to the present invention.

FIG. 1 shows a sub-frame made from a special three-channel aluminium profile 1. The frame consists of a profile that is bent into a rectangular frame held together in the joint by a bracket 5. The use of this separate bracket allows the width of the frame to be adjusted. Additionally, a rack and pinion assembly of the steering gear will be mounted on this bracket. The frame is secured to the chassis in mounting points 4, and carries the engine in mounting brackets 3. The short arms carrying the mounting points 4 are slightly bent away from the frame, in order to deform in a controlled way in case the vehicle should suffer a collision. Mounting points 2 are provided for holding the control arms. These mounting points 2 are machined with tight tolerances, and are some of the few parts of the sub-frame that are produced with high precision.

Figure 3:
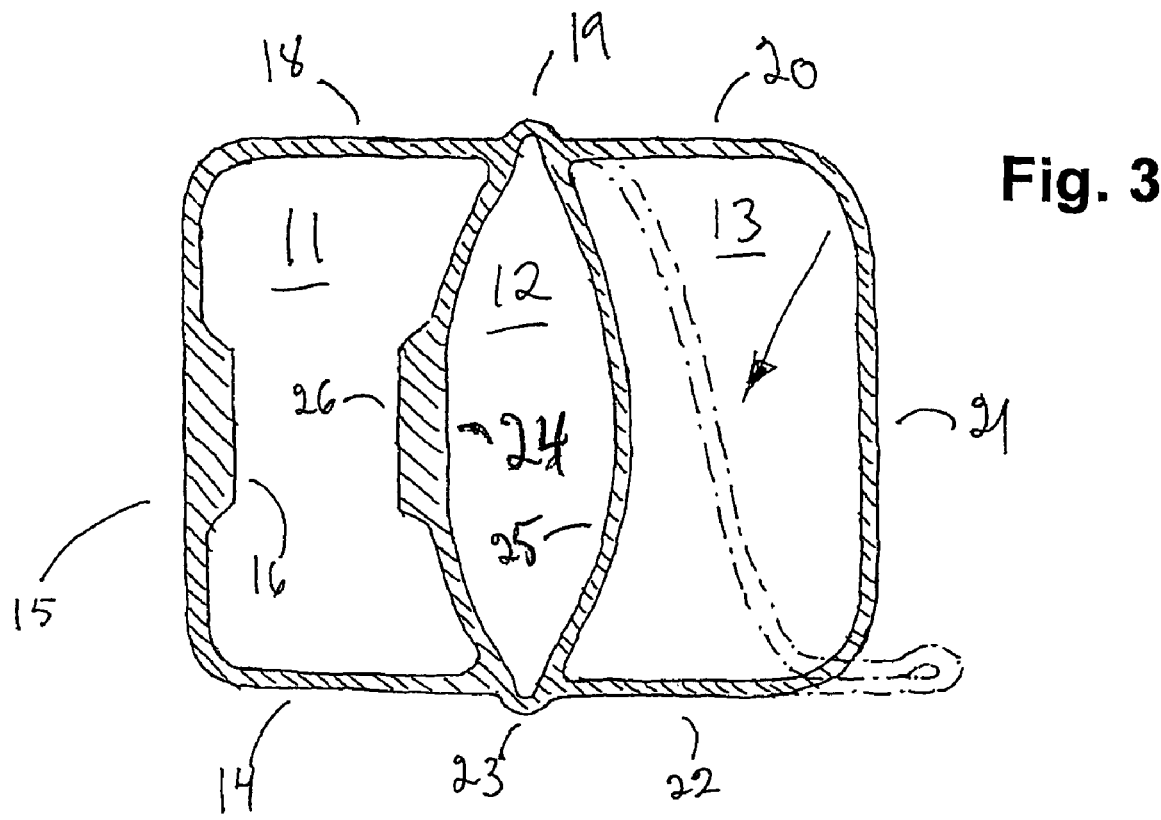
FIG. 3 is a cross section through an especially designed aluminium profile for the production of the inventive sub-frame.
Figure 4:
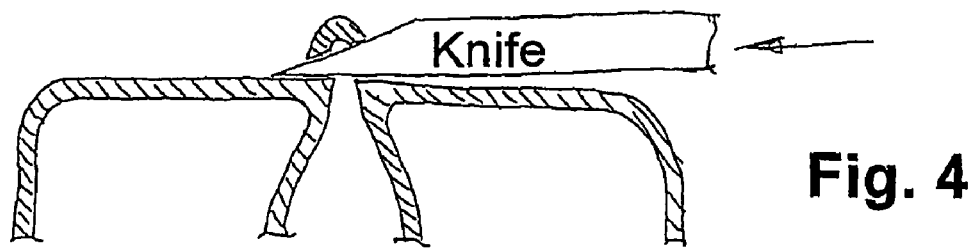
FIG. 4 shows how this special profile might be split into two parts by cutting away parts of the profile in localized areas.

FIG. 3 shows the special aluminium profile used for the manufacture of this sub-frame. In cross section, the profile includes three channels 11, 12, 13. Alternatively, the profile might be regarded as consisting of a first channel 11, formed by the sidewalls 17, 18, 24 and 14, and a second channel formed by the sidewalls 20, 21, 22 and 25. These channels are held together by the elevated ridges 19 and 23. By removing these ridges in localized areas, the profile may be split into two separate channels 11 and 13. The ridges may be cut away with a knife, as shown in FIG. 4, or milled away. FIG. 4 illustrates the ridges 19, 23 protruding above the plane of the surrounding sidewalls 18, 20 and 14, 22, respectively. This is for the easy removal of the ridges by a knife or by milling. However, it is also possible to avoid these ridges, and separate the channels 11, 13 by cutting into the material, e.g. with a saw.

However, it is preferred to use a profile with ridges 19, 23, using a knife to remove superfluous material, as by this method production of aluminium chips is avoided, making a subsequent cleaning step unnecessary.

A core idea of the present invention is to separate the functions of the frame between the two channels, by assigning the load carrying function to one channel, while mounting points are concentrated to the other channel. In the frame shown in FIG. 1, the channel 13 is carrying the load, forming the frame proper. No cuts are made into this channel, and it is preserved as a continuous closed structure. The other channel is used to form mounting brackets, by cutting, bending and machining in local points. In the example shown in FIG. 3, the sidewalls 15, 24 of the left channel 11 are provided with thickened sections 16, 26. These thickened sections 16, 26 are included in order to strengthen the profile in areas where high forces are exerted on the arm, like in the mounting points for the control arms 2.

However, in FIG. 1 is shown one departure from this separation principle, as two brackets 3 have been formed in the inner, load-bearing channel 13.

The dotted lines illustrate how the engine-mounting brackets may be produced by collapsing a part of the right channel 13. In this way, the continuous structure of the channel is preserved.

Figure 2:
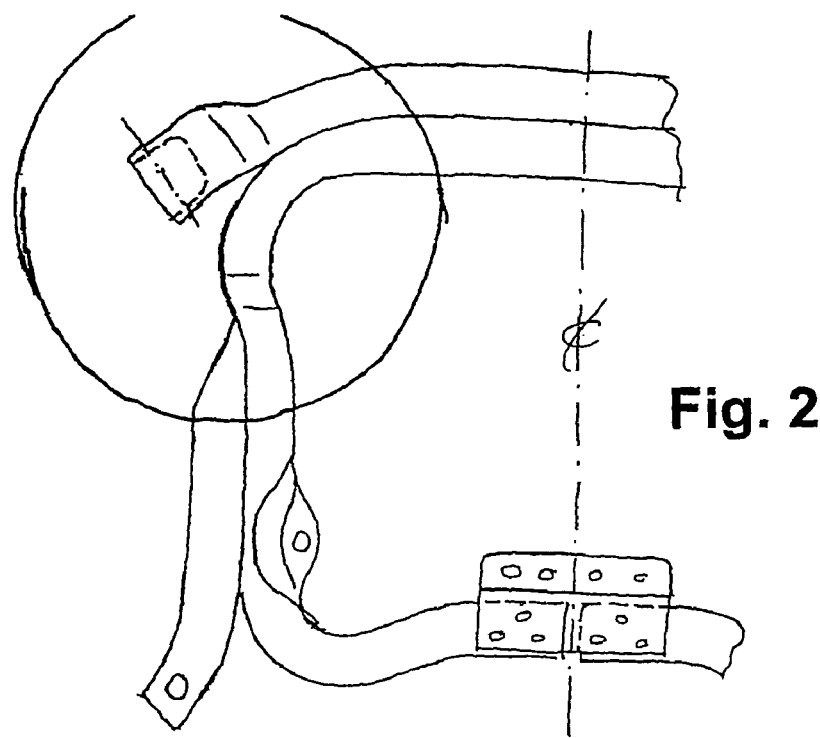
FIG. 2 is a top view of the same sub-frame.
Figure 5:
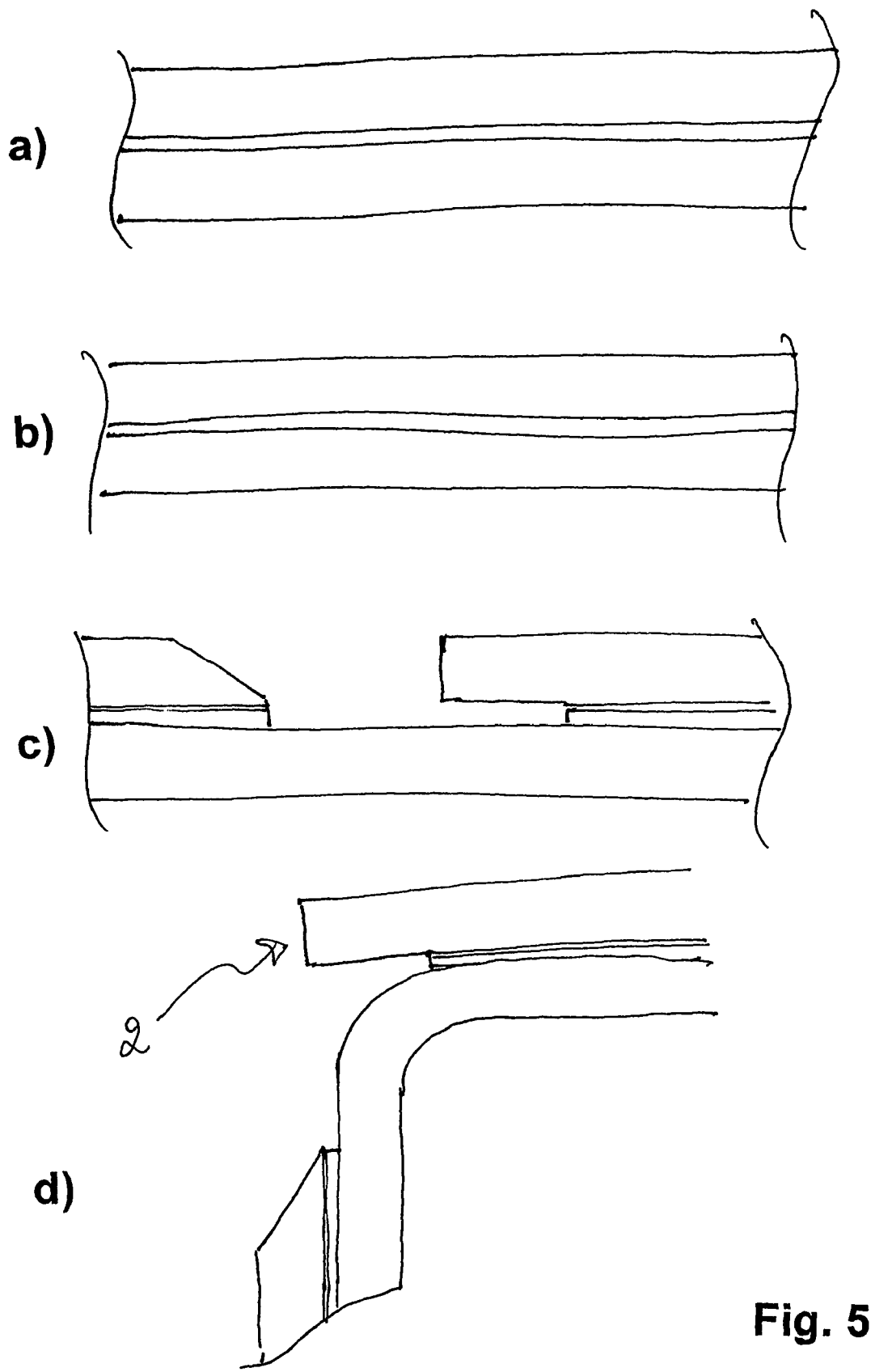
FIG. 5 is a schematic sequence showing some of the steps performed during the manufacture of the inventive sub-frame.

FIG. 5 has been added to show the principal method used when producing the sub-frame. The figure shows the individual steps performed when forming the knee within the encircled area in FIG. 2. It is of course impossible to bend the three-channel profile as it is.

FIG. 5 shows a raw profile in top view. In step b, a portion of the ridge 19 has been removed in a localized area. In step c, parts of the channel 13 have been cut away. As there is just one channel remaining in this area, the profile can be bended, step d. In subsequent steps, the protruding portion 2 will be machined into a mounting point for a control arm.

While the sub-frame shown in FIG. 1, produced from a profile as shown in FIG. 3, is a preferred embodiment of the invention, several modifications are possible within the scope of the appended claims. The first modification that springs into mind relates to the closing of the frame structure. In the embodiment shown in FIG. 1, this is obtained by means of a separate bracket 5 bridging the ends of the sub-frame. This bracket is bolted or nailed to the frame's ends. However, this bracket could easily be dispensed with and the ends welded together. This solution lends itself for those cases where no components are to be mounted on the sub-frame in this area.

Still another variation is to form the sub-frame as a u-shaped structure, open to the rear, and close the sub-frame with a cross member spanning the opening.

It is also possible to produce the sub-frame from a less complicated profile, i.e. a profile with only two channels, and dispensing with the intervening "split" channel. If ridges are present, they will appear in the walls of one of the channels. Splitting of the profile will result in one channel that is closed (in cross section), and one that is u-shaped.

As it is of importance to keep the load-bearing channel intact, this should be formed from the closed channel. Brackets and mounting points are then formed in the u-channel.

The invention claimed is:

1. A method for the manufacture of a sub-frame for a vehicle, including to produce an aluminium profile, said aluminium profile comprising: a first channel and a second channel with an intervening channel, the method comprising:
   splitting said first channel from said second channel in localized areas by removing wall material from said intervening channel;
   removing parts of said first channel to allow the second channel to be bent in said areas;
   forming the profile into the finished shape of the sub-frame, said second channel defining a load bearing frame; and
   forming the remaining parts of said first channel into mounting brackets for wheel suspension members and other external components.

2. A method as claimed in claim 1, wherein said intervening channel protrudes outside the adjacent first and second channels in ridges, and when splitting the profile to remove said ridges with a knife.

3. A method as claimed in claim 1 or 2, wherein the profile is split and material is removed in four areas, allowing the profile to be bent into a square frame structure, and closing the frame by welding opposing ends of the profile together.

4. A method as claimed in claim 1 or 2, wherein the profile is bent into a u-shaped structure which is closed with a cross-member spanning the ends of the second channel.

5. A method for the manufacture of a sub-frame for a vehicle, including to produce an aluminium profile, comprising a first channel and a second channel, the method comprising:
   splitting said first channel from said second channel in localized areas by removing wall material from said first channel and leave said second channel intact,
   removing parts of said first channel to allow the remaining second channel to be bent in said areas,
   forming the profile into the finished shape of the sub-frame, said second channel defining a load bearing frame, and
   forming the first channel into mounting brackets for wheel suspension members and other external components.

6. A sub-frame for a vehicle, including an aluminium profile, comprising a first channel and a second channel with an intervening channel, wherein portions of the first channel are split from the second channel in localized areas in which wall material from the intervening channel is removed, portions of the first channel are removed, and the second channel is bent along the localized areas, and said second channel forms a load bearing frame, the first channel being formed into mounting brackets for wheel suspension members and other external components.

7. A sub-frame as claimed in claim 6, wherein the profile forms a square frame structure, which is closed by welding opposing ends of the profile together.

8. A sub-frame as claimed in claim 6, wherein the profile forms a u-shaped structure.

9. A sub-frame as claimed in claim 8, wherein said u-shaped structure is closed with a cross-member spanning the ends of the profile.

10. An aluminium profile including a first channel and a second channel with an intervening channel, wherein said intervening channel is protruding outside the adjacent first and second channels in ridges, and portions of the first channel are split from the second channel in localized areas in which wall material from the intervening channel is removed, portions of the first channel are removed, and the second channel is bent along the localized areas.

* * * * *